United States Patent [19]
Evoy

[11] Patent Number: 5,758,133
[45] Date of Patent: May 26, 1998

[54] SYSTEM AND METHOD FOR ALTERING BUS SPEED BASED ON BUS UTILIZATION

[75] Inventor: David R. Evoy, Tempe, Ariz.

[73] Assignee: VLSI Technology, Inc., San Jose, Calif.

[21] Appl. No.: 581,647

[22] Filed: Dec. 28, 1995

[51] Int. Cl.$^6$ .................................................. G06F 1/08
[52] U.S. Cl. ................................................................ 395/556
[58] Field of Search ............................... 395/555, 556, 395/559, 560, 750, 280, 285, 287, 306

[56] References Cited

U.S. PATENT DOCUMENTS

| 3,571,806 | 3/1971 | Makie et al. | |
|---|---|---|---|
| 4,670,837 | 6/1987 | Sheets | 395/556 |
| 5,021,679 | 6/1991 | Fairbanks et al. | 307/66 |
| 5,218,704 | 6/1993 | Watts, Jr. et al. | 395/750 |
| 5,263,172 | 11/1993 | Olnowich | 395/800 |
| 5,416,434 | 5/1995 | Kootstra et al. | 327/113 |
| 5,418,969 | 5/1995 | Matsuzaki et al. | 395/750 |
| 5,430,881 | 7/1995 | Ikeda | 395/750 |
| 5,491,814 | 2/1996 | Yee et al. | 395/556 |

*Primary Examiner*—Glenn A. Auve
*Attorney, Agent, or Firm*—Harry M. Weiss; Jeffrey D. Moy; Harry M. Weiss & Associates, P.C.

[57] ABSTRACT

The present invention relates to a system and method for dynamically altering the speed of a bus based on utilization of the bus. The system will monitor a bus for a predetermined number of clock cycles. The system will then lower the frequency that the bus runs at if the bus is underutilized, or the system will increase the frequency that the bus runs at if the bus is at or nearing saturation.

15 Claims, 1 Drawing Sheet 5,758,133

SYSTEM AND METHOD FOR ALTERING BUS SPEED BASED ON BUS UTILIZATION

BACKGROUND OF THE INVENTION

1. Field of the Invention

This invention relates generally to computer systems and, more specifically, to a system and method for altering the frequency that a bus runs at based on utilization of the bus. By altering the frequency of the bus based on utilization of the bus, the power consumption of the computer will be lowered and less electromagnetic interference (EMI) will be generated.

2. Background of the Invention

In computer systems, specifically portable computer systems, it is desirable to maximize battery life and increase system performance. Both the battery life and the performance of the computer system are very dependent upon frequency. Performance of the computer system improves with higher frequencies, while battery life decreases with higher frequencies.

Generally, bus power consumption is not controlled. U.S. Pat. No. 5,263,172, issued on Nov. 16, 1993, to Olnowich, discloses a multiple speed synchronous bus having a single clock path for providing a first or a second speed based upon a speed indication signal. While this system does work, it does not dynamically alter the speed of the bus to find the optimum speed that the bus should be operating at based on utilization of the bus.

An extension to the Peripheral Component Interconnect (PCI) bus specification allows one to control the power consumption of PCI busses in portable computer systems. The operation of the CLKRUN# protocol is discussed in PCI Mobile Design Guide Rev 1.0, Oct. 27, 1994, section I, pages 7–11. However, the CLKRUN# protocol has not been adapted to desktop computer systems. Furthermore, the CLKRUN# protocol cannot be used on additional busses or for devices that do not support the CLKRUN# protocol. In any type of computer system, there are numerous busses. For example, in addition to a PCI bus, a portable computer system could have a local processor bus, a PC/AT bus, an Xbus, and various other busses both internal and external to the chips that make up the computer system.

Therefore, a need existed to provide a system and method for dynamically altering the bus speed based on utilization of the bus. This system and method would be more advantageous than the CLKRUN# protocol since it could be used on desktop computer systems, on other busses besides the PCI bus, on devices that do not support the CLKRUN# protocol, and could also be used in addition to the CLKRUN# protocol for further power savings. In addition, this system and method could be applied to an X86 interface where a processor's PLL is used as a clock multiplier as long as the frequency is adjusted in a slow manner so that the PLL can track the changes.

An additional benefit form this system and method would be a decrease in the amount of electromagnetic interference (EMI) generated by the computer system. Since each bus would generally be operating at a frequency lower than the maximum level, less EMI would be generated. By applying this system and method to multiple busses, it may be possible to even further lower the peak EMI. Furthermore, since the system and method allow the PLLs to constantly change the frequencies of the busses, the noise will be spread across a wider spectrum thereby even further reducing the EMI.

SUMMARY OF THE INVENTION

In accordance with one embodiment of the present invention, it is an object of the present invention to provide a system and method for lowering the power consumption of a computer system.

It is another object of the present invention to provide a system and method for lowering the power consumption of a computer system by dynamically altering the frequency that a computer system bus runs at for optimal power consumption and performance.

It is still another object of the present invention to provide a system and method for dynamically altering the frequency that a computer system bus runs at for optimal power consumption and performance thereby decreasing the amount of EMI generated by the computer system.

BRIEF DESCRIPTION OF THE PREFERRED EMBODIMENTS

In accordance with one embodiment of the present invention, a method for altering a frequency of a bus based on utilization of the bus is disclosed. The method comprises the steps of: monitoring the bus for a predetermined number of clock cycles; lowering the frequency that the bus runs at if the bus is underutilized; and increasing the frequency that the bus runs at if the bus is at or near saturation. The step of monitoring the bus may further comprise the steps of: clearing a clock cycle counter; clearing an idle bus counter; monitoring the bus during a clock cycle to determine if the bus is idle; increasing the clock cycle counter by one; increasing the idle bus counter by one if the bus was idle during the bus cycle; comparing the clock cycle counter to a preset clock cycle number; monitoring the bus during a next clock cycle for idleness if the clock cycle counter is not equal to the preset clock cycle number; comparing the idle bus counter to a preset idle bus number to determine if the bus was underutilized, nearing saturation or at saturation.

In accordance with another embodiment of the present invention, a system for altering a frequency of a bus based on utilization of the bus is disclosed. The system is comprised of monitor means for monitoring the bus for a predetermined number of clock cycles; and frequency adjusting means coupled to the monitoring means for sending a first signal to lower the frequency that the bus runs at if the bus is underutilized and for sending a second signal to increase the frequency that the bus runs at if the bus is at or nearing saturation.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
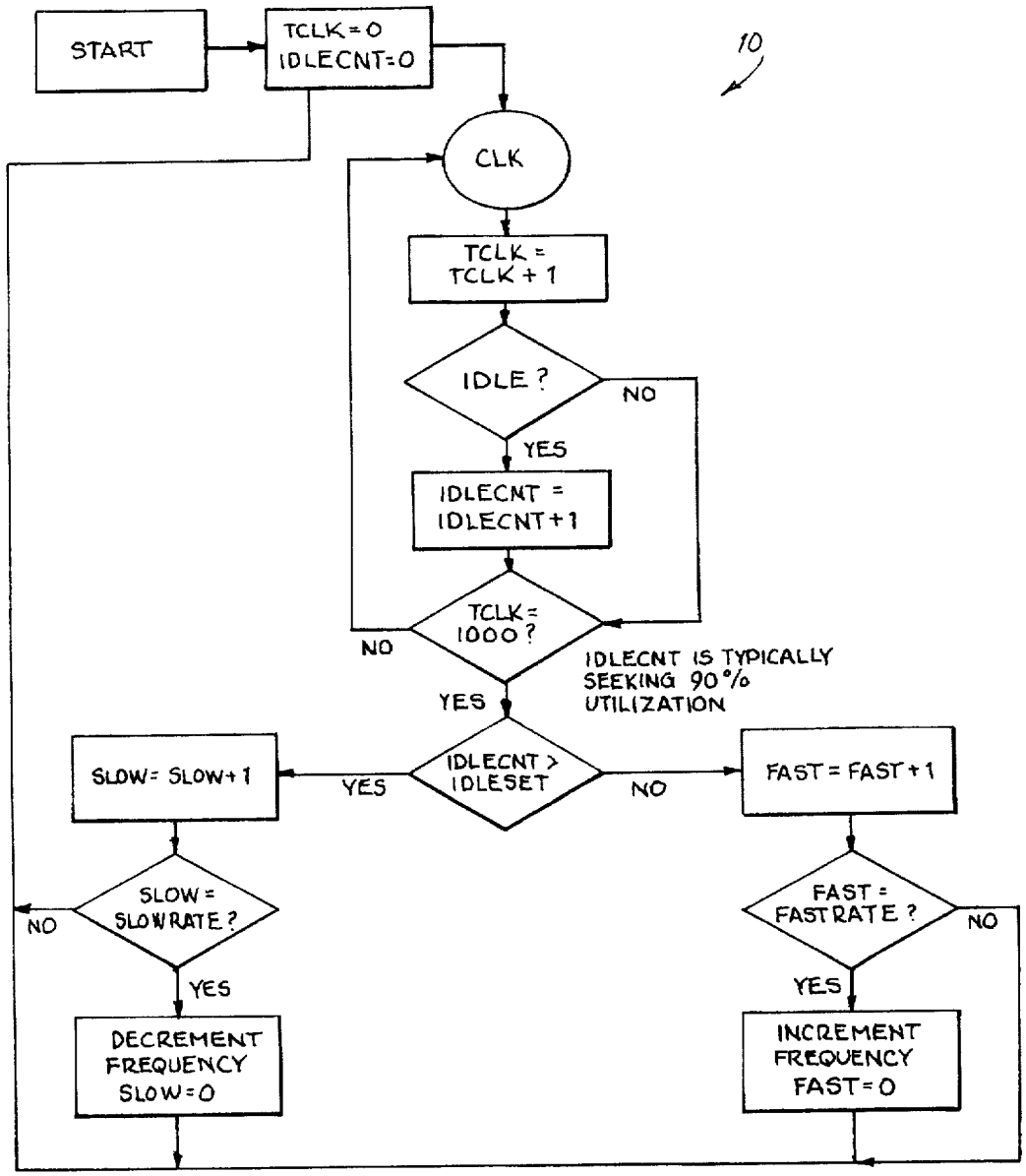
FIG. 1 shows a flow diagram representing a method for altering the frequency that a bus runs at based on utilization of the bus.

Referring to FIG. 1, a flow diagram 10 is shown. The flow diagram 10 represents a method for altering the frequency that a computer system (more specifically a portable computer system) bus runs at based on utilization of the bus. By altering the frequency that a bus runs at, one is able to maximize the life of the battery and increase the computer system's performance. As can be seen from the flow diagram 10, initially, a clock counter and an idle bus counter are established and cleared to zero. The bus is then monitored for a predetermined number of clock cycles. In the flow diagram 10, the bus is monitored for 1000 clock cycles. This number is an arbitrary number and can be altered to conform to the requirements of the computer system's user.

During the monitoring process, the clock counter is incremented by one. The bus is then monitored for idleness during the clock cycle. If the bus was idle during the clock cycle, the idle bus counter is incremented by one and the clock counter is then compared to the preset clock cycle number. If the bus was not idle during the clock cycle, the clock counter is immediately compared to the preset clock cycle number. When comparing the clock counter to the preset clock cycle number, if it is determined that the clock counter is not equal to the preset clock cycle number, the bus is monitored for another clock cycle. This loop will continuously monitor the bus for idleness until the clock counter is equal to the preset clock cycle number.

At the end of the monitoring loop, the number of idle states is compared to a preset idle state number. If the idle counter is greater than the preset idle state number, the bus was idle for a longer period of time than desired. Thus, the frequency that the bus is running at needs to be lowered in order to conserve power. If the number of the idle counter is less than the preset idle state number, the bus may be limiting the computer system's performance. Thus, the frequency of the bus may need to be increased.

Referring to the flow diagram 10, two separate counters, a fast counter and a slow counter, are used for modifying the frequency of the bus. The fast counter is used for increasing the frequency of the bus. When increasing the frequency, the fast counter is increased by one. The fast counter is then compared to a preset FASTRATE number. The FASTRATE number controls the number of samples that must occur with the bus overutilized before the frequency that the bus runs at will be altered. The FASTRATE number should generally be set at one since the bus can speed up at a rate faster than the bus can slow down. If the FASTRATE number is equal to the fast counter, the frequency of the bus is increased at a preset rate. The fast counter is then cleared to zero, the clock counter and the idle bus counter are also cleared to zero, and the monitoring loop begins again. If the fast counter is not equal to the FASTRATE number, the clock counter and the idle bus counter are cleared to zero, and the monitoring loop begins again. The rate of change for the frequency is dependent on whether a Phase Lock Loop (PLL) is used as a clock multiplier. If a PLL is used, the maximum frequency change rate should be set at 0.1%. This change rate must be dampened by the PLL generating the clock to assure that 0.1% is not violated per clock cycle. If a 0.1% change rate is used, PLL design is greatly simplified because no large changes in the target value occur, thereby keeping the PLL controlled by the algorithm shown in FIG. 1 in continuous lock. If a PLL is not used as a clock multiplier for controlling the frequency of the bus, the rate of change can be set at a higher level. For example, a 10% change rate could be used, 10% being a practical limitation, with even higher limits being possible.

The slow counter is used for decreasing the frequency of the bus. Decreasing the frequency of the bus is accomplished in much of the same way as increasing the frequency of the bus. When decreasing the frequency, the slow counter is increased by one. The slow counter is then compared to a preset SLOWRATE number. The SLOWRATE number controls the number of samples that must occur with the bus under utilized before the frequency that the bus runs at will be altered. The SLOWRATE number is generally set at a number greater than one. This makes the clock slow down at a rate less than the speed up rate. If the SLOWRATE number is equal to the slow counter, the frequency of the bus is decreased at a preset rate. The slow counter is then cleared to zero, the clock counter and the idle bus counter are also cleared to zero, and the monitoring loop begins again. If the slow counter is not equal to the SLOWRATE number, the clock counter and the idle bus counter are cleared to zero, and the monitoring loop begins again. The rate of change for the frequency is again dependent on whether a PLL is used as a clock multiplier. If a PLL is used, the maximum frequency change rate should be set at 0.1%. If a PLL is not used as a clock multiplier, the rate of change can be set at a higher level.

Figure 2:
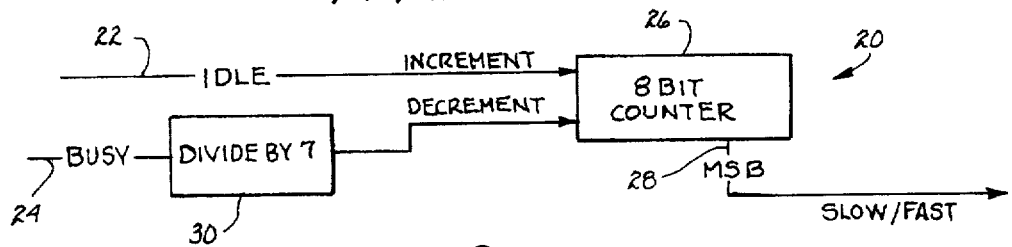
FIG. 2 shows a simplified block diagram of one implementation of a system for altering the frequency that a bus runs at based on utilization of the bus.

Referring to FIG. 2, a very simplified version of a system for controlling the frequency of a bus based on utilization of the bus 20 (hereinafter system 20) is shown. The system 20 is comprised of an IDLE signal line 22 and a BUSY signal line 24. The signal lines 22 and 24 are used for monitoring whether the bus is busy or idle. The signal lines 22 and 24 are coupled to a counter 26 which monitors the two signal lines 22 and 24. When the counter is below a certain value, the bus is operating too slowly. Thus, the bus frequency needs to be increased. If the counter is above a certain value, the bus is operating at too high of a frequency. The Most Significant Bit (MSB) 28 of the counter is used to send a signal to increase or decrease the bus frequency.

The BUSY signal line 24 may be coupled to a divider 30. By coupling the BUSY signal line 24 to a divider, the IDLE signal line 22 will have more of an effect on the counter than the BUSY signal line 24. Since the system is configured to try to keep the counter at 50% of its maximum value, many more BUSY states will be required than IDLE states. When the count is below 80 h, the bus is operating at too slow of a level and needs to speed up. Note, if only BUSY states occur, the counter would decrement to zero. When the count is above 80 h, the bus is operating at too high of a level and needs to slow down. Under the above embodiment, with a divider 30 which divides the signal by 7, the system 20 will continuously seek a bus saturation level of ⅞ or 87.5%.

While the invention has been particularly shown and described with reference to preferred embodiments thereof, it will be understood by those skilled in the art that the foregoing and other changes in form and details may be made therein without departing from the spirit and scope of the invention. For example, a counter and a comparator could be added to the system 20 so that the bus will be monitored for a predetermined number of bus cycles. Another counter and comparator could be added to the MSB so that the bus frequency will only be increased or decreased after a certain amount of being idle or busy.

I claim:

1. A method for altering a frequency that a bus runs at based on utilization of the bus comprising the steps of:

monitoring said bus for a predetermined number of clock cycles;

lowering said frequency that said bus runs at if said bus is under utilized by comparing a number of times said bus was idle to a preset number; and increasing said frequency that said bus runs at if said bus is one of nearing saturation or at saturation by comparing a number of times said bus was active to a preset number.

2. The method of claim 1 wherein said step of monitoring said bus further comprises the steps of:
   clearing a clock cycle counter;
   clearing an idle bus counter;
   monitoring said bus during a clock cycle to determine if said bus is idle;
   increasing said clock cycle counter by one;
   increasing said idle bus counter by one if said bus was idle during said clock cycle;
   comparing said clock cycle counter to a preset clock cycle number;
   monitoring said bus during a next clock cycle for idleness if said clock cycle counter is not equal to said preset clock cycle number; and
   comparing said idle bus counter to a preset idle bus number to determine if said bus was one of under utilized, nearing saturation or at saturation.

3. The method of claim 1 wherein said step of lowering said frequency that said bus runs at further comprises the steps of:
   incrementing a slow down counter by one;
   comparing said slow down counter to a preset slow down number;
   decreasing said frequency that said bus runs at by a preset change rate if said slow down counter is equal to said preset slow down number; and
   monitoring said bus for another predetermined number of clock cycles if said slow down counter is not equal to said preset slow down number.

4. The method of claim 3 wherein said preset number for comparing said slow down counter is at least 4.

5. The method of claim 3 wherein said change rate for decreasing said frequency is not greater than 0.1% of said frequency.

6. The method of claim 1 wherein said step of increasing said frequency that said bus runs at further comprises the steps of:
   incrementing a fast counter by one;
   comparing said fast counter to a preset number;
   increasing said frequency that said bus runs at by a preset change rate if said fast counter is equal to said preset number; and
   monitoring said bus for another predetermined number of clock cycles if said fast counter is not equal to said preset number.

7. The method of claim 6 wherein said preset number for comparing said fast counter is 1.

8. The method of claim 6 wherein said change rate for increasing said frequency is not greater than 0.1% of said frequency.

9. A method for altering a frequency that a bus runs at based on utilization of the bus comprising the steps of:
   clearing a clock cycle counter;
   clearing an idle bus counter;
   monitoring said bus during a clock cycle to determine if said bus is idle;
   increasing said clock cycle counter by one;
   increasing said idle bus counter by one if said bus was idle during said clock cycle;
   comparing said clock cycle counter to a preset clock cycle number;
   monitoring said bus during a next clock cycle for idleness if said clock cycle counter is not equal to said preset clock cycle number;
   comparing said idle bus counter to a preset idle bus number to determine if said bus was one of under utilized, nearing saturation or at saturation;
   lowering said frequency that said bus runs at if said bus is under utilized, said step of lowering said frequency comprising the steps of:
   incrementing a slow down counter by one;
   comparing said slow down counter to a preset slow down number;
   decreasing said frequency that said bus runs at by a preset change rate if said slow down counter is equal to said preset slow down number;
   clearing said clock cycle counter;
   clearing said idle bus counter; and
   monitoring said bus for another predetermined number of clock cycles if said slow down counter is not equal to said preset slow down number; and
   increasing said frequency that said bus runs at if said bus is at least one of nearing saturation and at saturation, said step of increasing said frequency comprising the steps of:
   incrementing a fast counter by one;
   comparing said fast counter to a preset number;
   increasing said frequency that said bus runs at by a preset change rate if said fast counter is equal to said preset number;
   clearing said clock cycle counter;
   clearing said idle bus counter; and
   monitoring said bus for another predetermined number of clock cycles if said fast counter is not equal to said preset number.

10. The method of claim 9 wherein said change rate for increasing said frequency is not greater than 0.1% of said frequency.

11. The method of claim 9 wherein said change rate for decreasing said frequency is not greater than 0.1% of said frequency.

12. A system for altering a frequency that a bus runs at based on utilization of the bus comprising:
    monitor means for monitoring said bus for a predetermined number of clock cycles; and
    frequency adjusting means coupled to said monitoring means for sending a first signal to lower said frequency that said bus runs at if said bus is under utilized by comparing a number of times said bus was idle to a preset number and for sending a second signal to increase said frequency that said bus runs at if said bus is one of nearing saturation or at saturation by comparing a number of times said bus was active to a preset number.

13. The system of claim 12 wherein said frequency adjusting means further comprises comparator means for comparing a number of times said bus is idle and a number of times said bus is busy.

14. The system of claim 12 wherein said frequency lowering means lowers said frequency of said bus at a rate not greater than 0.1% of said frequency.

15. The system of claim 12 wherein said frequency increasing means increases said frequency of said bus at a rate not greater than 0.1% of said frequency.

* * * * *